US011816881B2

(12) United States Patent
Paik et al.

(10) Patent No.: US 11,816,881 B2
(45) Date of Patent: Nov. 14, 2023

(54) MULTIPLE OBJECT DETECTION METHOD AND APPARATUS

(71) Applicant: CHUNG ANG UNIVERSITY INDUSTRY ACADEMIC COOPERATION FOUNDATION, Seoul (KR)

(72) Inventors: Joon Ki Paik, Seoul (KR); Sang Woo Park, Seoul (KR); Dong Geun Kim, Cheonan-si (KR); Dong Goo Kang, Seoul (KR)

(73) Assignee: CHUNG ANG UNIVERSITY INDUSTRY ACADEMIC COOPERATION, Seoul (KR)

( * ) Notice: Subject to any disclaimer, the term of this patent is extended or adjusted under 35 U.S.C. 154(b) by 0 days.

(21) Appl. No.: 17/863,387

(22) Filed: Jul. 12, 2022

(65) Prior Publication Data

US 2022/0351502 A1   Nov. 3, 2022

Related U.S. Application Data (63) Continuation of application No. PCT/KR2020/008888, filed on Jul. 8, 2020.

(30) Foreign Application Priority Data

Jan. 31, 2020   (KR) ........................ 10-2020-0011535

(51) Int. Cl.
*G06V 10/80*   (2022.01)
*G06V 10/77*   (2022.01)
(Continued)

(52) U.S. Cl.
CPC ............ *G06V 10/806* (2022.01); *G06V 10/52* (2022.01); *G06V 10/7715* (2022.01); *G06V 10/82* (2022.01)

(58) Field of Classification Search
CPC .. G06V 10/806; G06V 10/52; G06V 10/7715; G06V 10/82; G06V 10/40;
(Continued)

(56) References Cited

U.S. PATENT DOCUMENTS 11,488,283 B1 * 11/2022 Liu ........................... G06T 7/55
11,651,588 B1 *  5/2023 Yeh ........................ G06V 10/82
                                                                382/181

(Continued)

FOREIGN PATENT DOCUMENTS

KR   1020180062422 A    6/2018
KR     101920281 B1    11/2018
(Continued)

OTHER PUBLICATIONS

Zhao et al. "A New Feature Pyramid Network for Object Detection" 2019 International Conference on Virtual Reality and Intelligent Systems (ICVRIS) p. 428-431; 2019 (Year: 2019).*
(Continued)

*Primary Examiner* — Ming Y Hon (57) ABSTRACT

Disclosed are multiple object detection method and apparatus. The multiple object detection apparatus includes a feature map extraction unit for extracting a plurality of multi-scale feature maps based on an input image, and a feature map fusion unit for generating a multi-scale fusion feature map including context information by fusing adjacent multi-scale feature maps among the plurality of multi-scale feature maps generated by the feature map extraction unit.

7 Claims, 7 Drawing Sheets

(51) Int. Cl.
*G06V 10/82* (2022.01)
*G06V 10/52* (2022.01)

(58) Field of Classification Search
CPC . G06N 3/04; G06N 3/08; G06N 3/082; G06T 15/08
See application file for complete search history.

(56) References Cited

U.S. PATENT DOCUMENTS

| | | | | |
|---|---|---|---|---|
| 2021/0365716 | A1* | 11/2021 | Li | G06V 10/764 |
| 2022/0019840 | A1* | 1/2022 | Xie | G06Q 30/0601 |
| 2022/0044053 | A1* | 2/2022 | Wang | G06F 18/24143 |
| 2022/0391636 | A1* | 12/2022 | Lian | G06F 18/2137 |
| 2022/0398456 | A1* | 12/2022 | Gao | G06V 10/454 |

FOREIGN PATENT DOCUMENTS

| | | |
|---|---|---|
| KR | 101930940 B1 | 12/2018 |
| KR | 101932009 B1 | 12/2018 |
| KR | 1020190131206 A | 11/2019 |

OTHER PUBLICATIONS

Zhao et al. "Multi-scale object detection by top-down and bottom-up feature pyramid network" Journal of Systems Engineering and Electronics; vol. 30, No. 1, Feb. 2019, pp. 1-12 (Year: 2019).*

Notice to Submit a Response from Korean Intellectual Property Office dated Feb. 22, 2021 for KR Patent Application No. 10-2020-0011535.

Notice Decision to Grant a Patent from Korean Intellectual Property Office dated Aug. 13, 2021 for KR Patent Application No. 10-2020-0011535.

International Search Report of PCT/KR2020/008888, dated Oct. 28, 2020.

Written Opinion of International Search Authority for PCT/KR2020/008888, dated Oct. 28, 2020.

* cited by examiner

| | Method | Backbone | Input size | FPS | mAP (%) | GPU |
|---|---|---|---|---|---|---|
| Two stage | Fast [4] | VGG-16 | ~1000 x 600 | 0.5 | 70.0 | K40 |
| | Faster [7] | VGG-16 | ~1000 x 600 | 7 | 73.2 | Titan X |
| | OHEM [16] | VGG-16 | ~1000 x 600 | 7 | 74.6 | Titan X |
| | R-FCN [5] | ResNet-101 | ~1000 x 600 | 9 | 80.5 | Titan X |
| One stage | SSD321 [8] | ResNet-101 | 321 x 321 | 11.2 | 77.1 | Titan X |
| | SSD300 [8] | Vgg-16 | 300 x 300 | 46 | 77.2 | Titan X |
| | SSD300 [8] | Vgg-16 | 300 x 300 | 85 | 77.2 | 1080 Ti |
| | RSSD300 [3] | VGG-16 | 300 x 300 | 35 | 78.5 | Titan X |
| | DSSD321 [9] | ResNet-101 | 321 x 321 | 9.5 | 78.6 | Titan X |
| | SSD512 [8] | VGG-16 | 512 x 512 | 19 | 79.8 | Titan X |
| | SSD513 [8] | ResNet-101 | 513 x 513 | 6.8 | 80.6 | Titan X |
| | RSSD512 [3] | VGG-16 | 512 x 512 | 16.6 | 80.8 | Titan X |
| | DSSD513 [9] | ResNet-101 | 513 x 513 | 5.5 | 81.5 | Titan X |
| | Our model 320 | VGG-16 | 320 x 320 | 63 | 79.1 | 1080 Ti |
| | Our model 512 | VGG-16 | 512 x 512 | 33 | 81.0 | 1080 Ti |

MULTIPLE OBJECT DETECTION METHOD AND APPARATUS

CROSS-REFERENCE TO RELATED APPLICATION

This application is a continuation of pending PCT International Application No. PCT/KR2020/008888, which was filed on Jul. 8, 2020, and which claims priority to Korean Patent Application No. 10-2020-0011535, filed on Jan. 31, 2020, in the Korean Intellectual Property Office. The disclosures of which are hereby incorporated by reference in their entireties

TECHNICAL FIELD

The present disclosure relates to multiple object detection method and apparatus capable of detecting multiple objects based on adjacent feature fusion.

BACKGROUND ART

Object detection is one of the most important research areas in the field of computer vision. Many object detectors recently proposed have applied convolutional neural networks (CNNs), and as a result, high accuracy and high processing speed could be achieved.

Deep learning-based object detection methods are divided into two types, a one-stage method and a two-stage method. The two-stage method uses a sliding window and anchor boxes of various ratios and sizes to find object proposals quickly and accurately with low computational cost. On the other hand, the one-stage method provides faster speed than the two-stage method by performing the detection as a single regression problem, but its processing speed is relatively slow. The one-stage method is suitable for use in real-time applications such as an intelligent surveillance system and an advanced driver assistance system (ADAS) because it enables a real-time processing speed.

A region-based convolutional neural network (R-CNN) is an early technology of a detector using the two-stage method, which has applied CNN to the detector for the first time. However, since an external proposal algorithm rather than the CNN is used to propose object candidates and these proposals are processed with different CNNs, the speed is slow. A fast R-CNN was manufactured to process each of the proposals in a single CNN model by using region of interest (ROI) pooling to increase the speed. A faster R-CNN proposes a region proposal network (RPN) to enable the object candidate proposal method with a neural network, thereby first making the detector in an end-to-end method. Therefore, the faster R-CNN can provide high processing speed and high detection accuracy close to real-time processing to become a base technology for various two-stage methods. A region-based fully convolutional network (R-FCN) may effectively reduce the number of feature channels required for computation by replacing ROI pooling with position-sensitive ROI pooling, thereby achieving higher accuracy and faster speed than the faster R-CNN.

You Only Look Once (YOLO) and the single shot multibox detector (SSD) are the most often used as the basic technology of detectors that have been proposed as early models of the one-stage methods. The YOLO and the SSD are designed to enable real-time processing speed while maintaining high accuracy. The YOLO divides an input image into multiple grid cells of S×S, and each grid cell predicts bounding boxes of all classes. YOLO version 2 achieves high accuracy by removing fully connected layers from YOLO and introducing anchor boxes. The YOLO and the YOLO version 2 have a disadvantage of not being robust to small object detection.

DISCLOSURE

Technical Problem

An object of the present disclosure is to provide multiple object detection method and apparatus capable of detecting multiple objects based on adjacent feature fusion.

Another object of the present disclosure is to provide adjacent feature fusion-based multiple object detection method and apparatus capable of more efficiently using context information by combining only adjacent features.

Yet another object of the present disclosure is to provide multiple object detection method and apparatus that are more robust to multi-scale object detection.

Technical Solution

According to an aspect of the present disclosure, there is provided a multiple object detection apparatus capable of detecting multiple objects base on adjacent feature fusion.

According to an embodiment of the present disclosure, there may be provided a multiple object detection apparatus including a feature map generation unit for extracting a plurality of multi-scale feature maps based on an input image; and a feature map fusion unit for generating a multi-scale fusion feature map including context information by fusing adjacent feature maps among the plurality of feature maps generated by the feature map generation unit.

The feature map fusion unit may generate a fusion feature map by fusing each feature map and an adjacent low-resolution feature map, wherein a feature map with the smallest scale among the plurality of feature maps has no adjacent low-resolution feature map and thus may generate a fusion feature map without fusion.

The multiple object detection apparatus may include a first convolutional layer for converting a high-resolution feature map of two feature maps into an output volume; a deconvolution layer for converting a low-resolution feature map of the two feature maps into the same size as the high-resolution feature map; a second convolutional layer for converting the converted feature map into an output volume; and a fusion layer for generating a feature map including the context information by summing the results of the first convolutional layer and the second convolutional layer, respectively.

The feature map generation unit may be a single multibox detector (SSD).

The multiple object detection apparatus may further include an object detection unit for detecting objects using a multi-scale feature map including the context information generated by the feature map fusion unit.

According to another aspect of the present disclosure, there is provided a method capable of detecting multiple objects base on adjacent feature fusion.

According to an embodiment of the present disclosure, there may be provided a multiple object detection method including the steps of (a) extracting a plurality of multi-scale feature maps based on an input image; and (b) generating a multi-scale fusion feature map including context information by fusing adjacent feature maps among the generated plurality of feature maps.

In step (b), a fusion feature map may be generated by fusing each feature map and an adjacent low-resolution feature map, wherein a feature map with the smallest scale among the plurality of feature maps has no adjacent low-resolution feature map and thus may generate a fusion feature map without fusion.

Step (b) may include the steps of converting a high-resolution feature map of two feature maps into an output volume by means of a convolution layer; converting a low-resolution feature map of the two feature maps into the same size as the high-resolution feature map; converting the converted feature map into each output volume by means of the convolution layer; and generating a feature map including the context information by summing the results of the high-resolution feature map converted into the output volume and the converted feature map, respectively.

The multiple object detection method may further include the step of detecting objects using a multi-scale feature map including the generated context information, after step (b).

Advantageous Effects

According to an exemplary embodiment of the present disclosure, there is an advantage of more efficiently using context information by providing the multiple object detection method and apparatus to combine only adjacent features.

Further, there is an advantage that the present disclosure is more robust to multi-scale object detection.

BEST MODE

A singular form used in the present specification may include a plural form if there is no clearly opposite meaning in the context. In this specification, terms such as "comprising" or "including" should not be interpreted as necessarily including all various components or various steps disclosed in this specification, and it should be interpreted that some component or some steps among them may not be included or additional components or steps may be further included. In addition, terms including "unit", "module", and the like disclosed herein mean a unit that processes at least one function or operation, and this may be implemented by hardware or software, or a combination of hardware and software.

Hereinafter, embodiments of the present disclosure will be described in detail with reference to the accompanying drawings.

Figure 1:
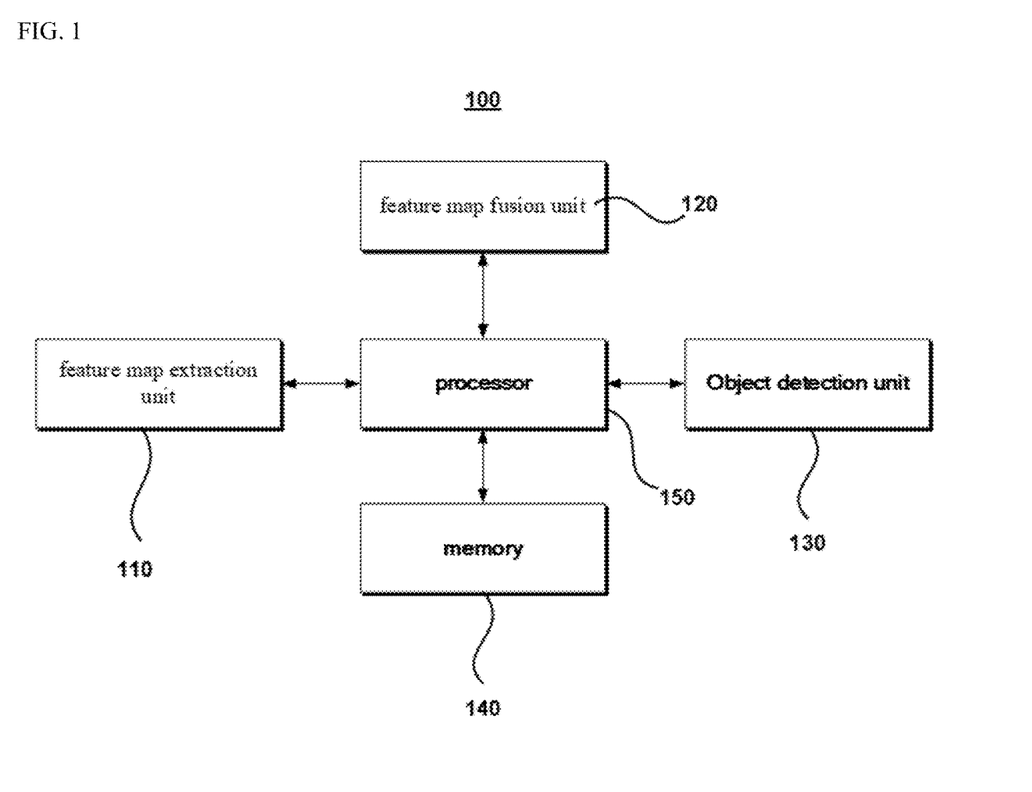
FIG. 1 is a block diagram schematically illustrating a configuration of a multiple object detection apparatus according to an embodiment of the present disclosure.
Figure 2:
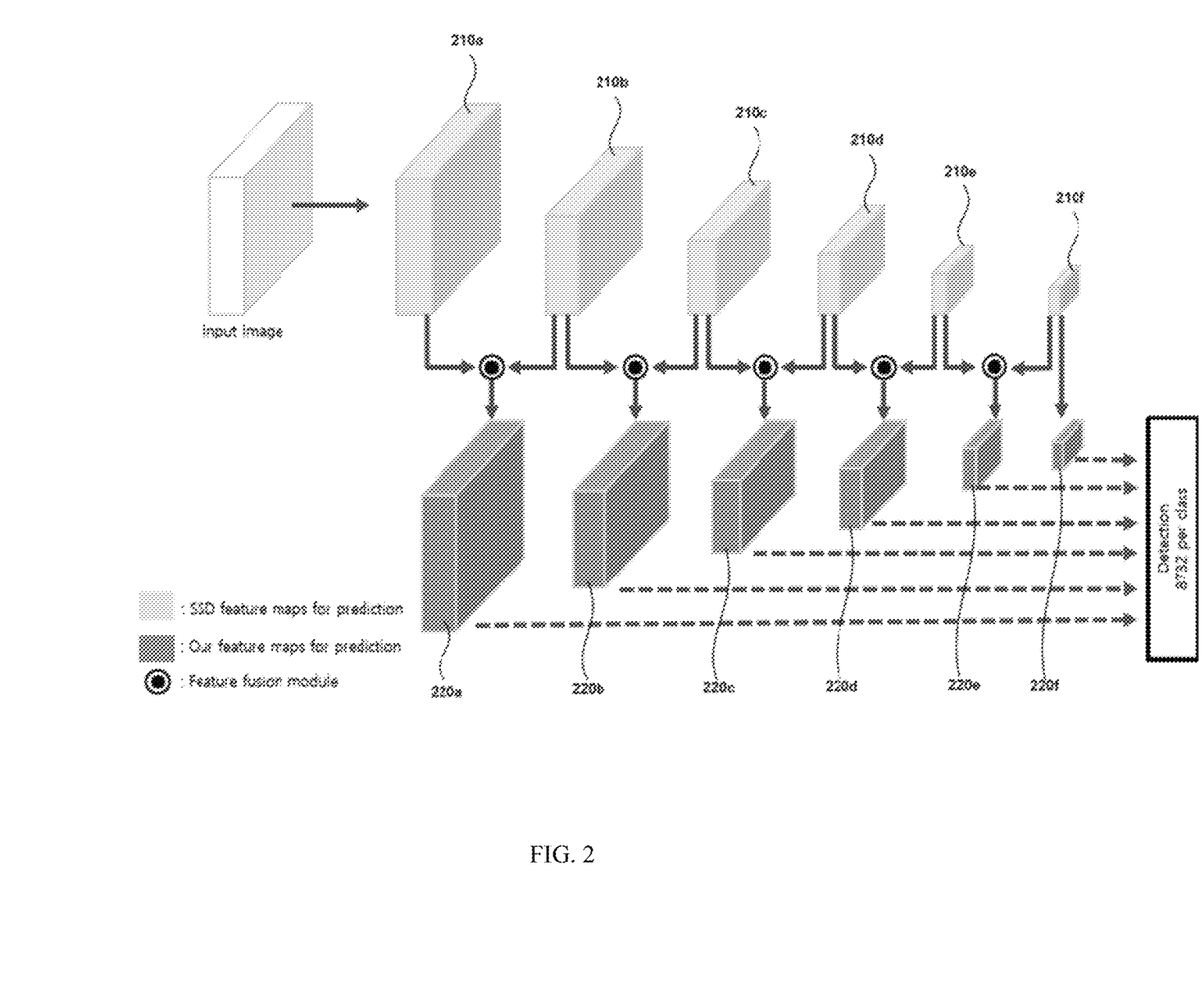
FIG. 2 is a diagram illustrating a feature map fusion process according to an embodiment of the present disclosure.
Figure 3:
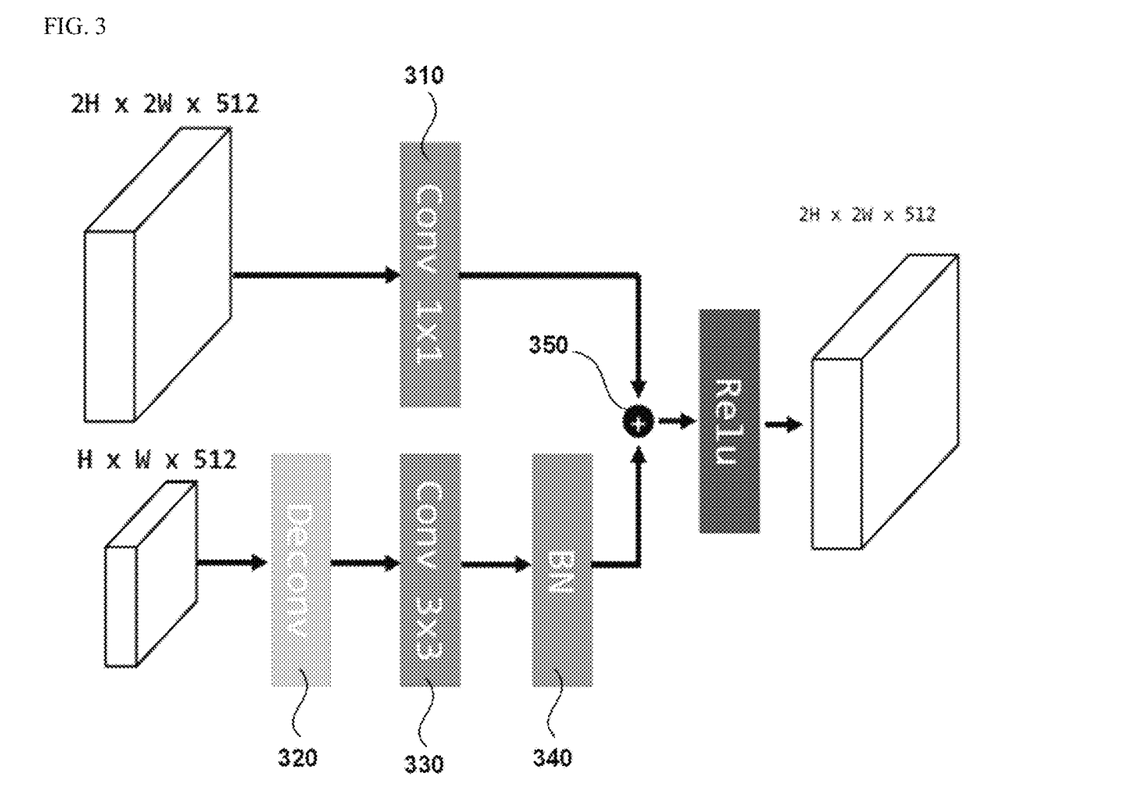
FIG. 3 is a diagram illustrating a detailed structure of a feature map fusion unit according to an embodiment of the present disclosure.
Figure 4:
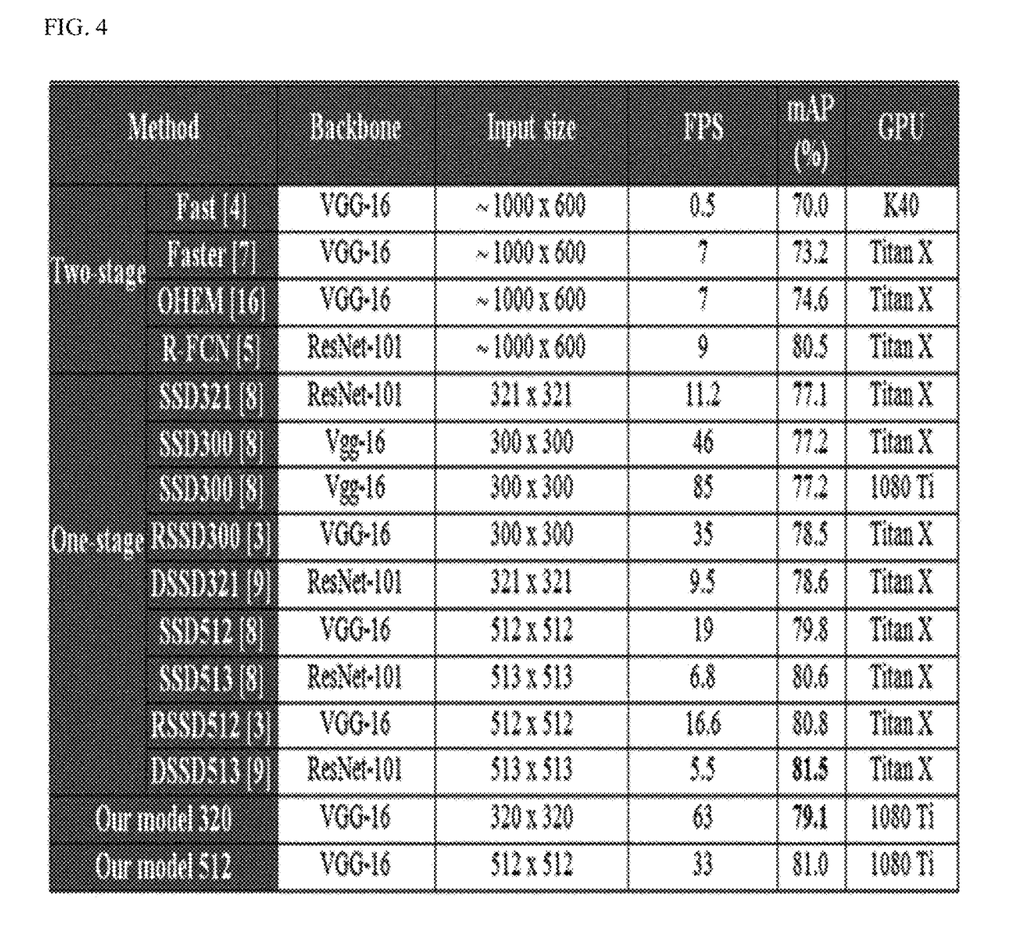
FIG. 4 is a diagram summarizing the results of detecting multiple objects according to an embodiment of the present disclosure and the related art.
Figure 5:
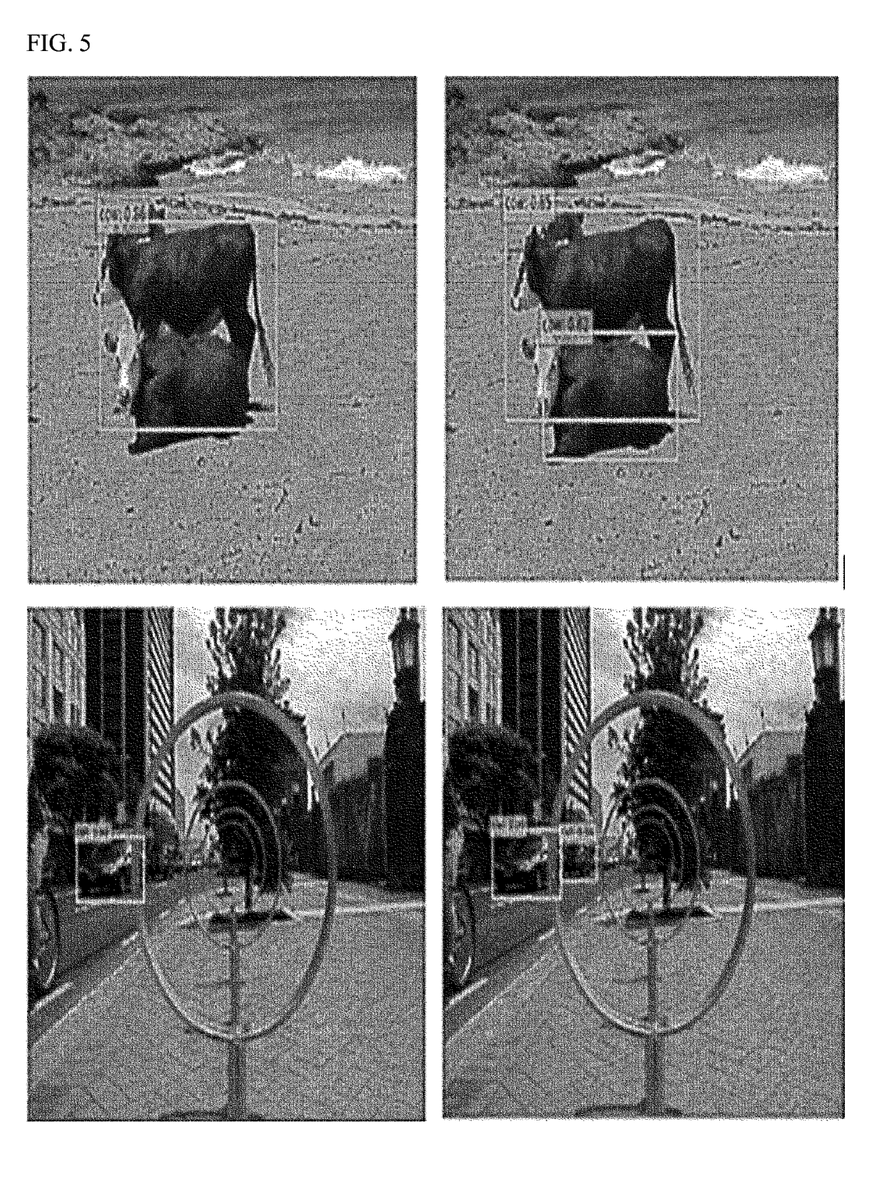
FIG. 5 is a diagram illustrating a data set used in FIG. 4.
Figure 6:
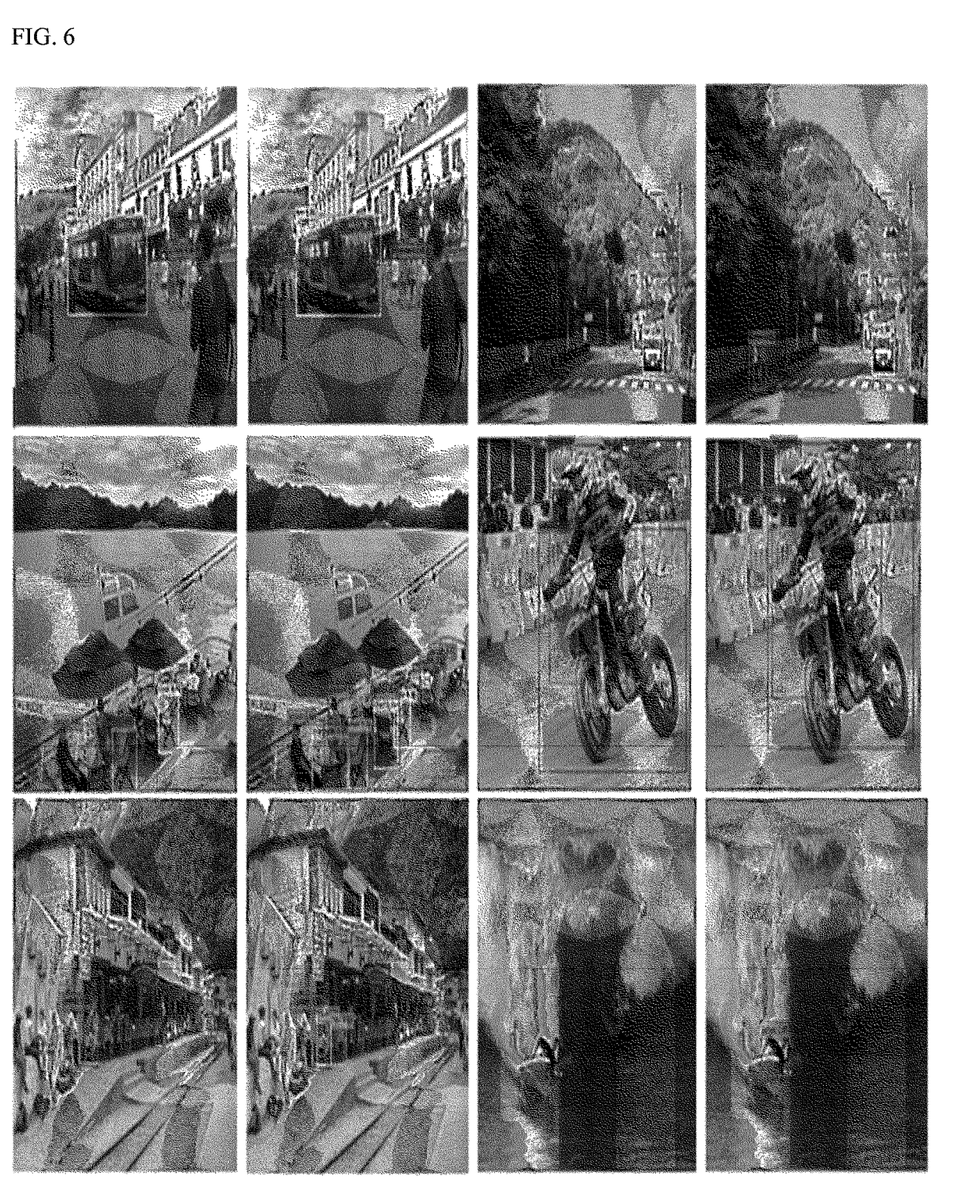
FIG. 6 is a diagram illustrating parts of the results of detecting multiple objects according to another embodiment of the present disclosure and the related art.

FIG. 1 is a block diagram schematically illustrating a configuration of a multiple object detection apparatus according to an embodiment of the present disclosure, FIG. 2 is a diagram illustrating a feature map fusion process according to an embodiment of the present disclosure, FIG. 3 is a diagram illustrating a detailed structure of a feature map fusion unit according to an embodiment of the present disclosure, FIG. 4 is a diagram summarizing results of detecting multiple objects according to an embodiment of the present disclosure and the related art, FIG. 5 is a diagram illustrating a data set used in FIG. 4, and FIG. 6 is a diagram illustrating parts of results of detecting multiple objects according to another embodiment of the present disclosure and the related art.

Referring to FIG. 1, a multiple object detection apparatus 100 according to an embodiment of the present disclosure is configured to include a feature map extraction unit 110, a feature map fusion unit 120, an object detection unit 130, a memory 140, and a processor 150.

The feature map extraction unit 110 is a means for extracting a plurality of multi-scale feature maps based on an input image. For example, the feature map extraction unit 110 may be a single shot multibox detector (SSD).

In an embodiment of the present disclosure, it is assumed that the feature map extraction unit 110 is an SSD and it will be mainly described.

For example, the feature map extraction unit 110 may extract six feature maps having different scales. Assuming that the feature map extraction unit 110 is the SSD, it has been described that six multi-scale feature maps are extracted, but the number of extracted feature maps is not necessarily limited to six.

In addition, since a method of extracting an SSD-based multi-scale feature map itself is a known phase, a separate description thereof will be omitted.

According to an embodiment of the present disclosure, the multiple object detection apparatus 100 does not extract an object using the multi-scale feature map extracted by the feature map extraction unit 110, but may be used to generate context information.

This will be more clearly understood by the following description.

The feature map fusion unit 120 fuses adjacent feature maps among the multi-scale feature maps generated by the feature map extraction unit 110 to generate a multi-scale fusion feature map including context information. This will be described in more detail with reference to FIG. 2.

For example, the multi-scale feature maps generated by the feature map extraction unit 110 are referred to as a first feature map 210a, the second feature map 210b, a third feature map 210c, a fourth feature map 210d, a fifth feature map 210e, and a sixth feature map 210f in increasing order of scale.

The feature map fusion unit 120 may generate a first fusion feature map 220a by fusing the adjacent first feature map 210a and second feature map 210b, and generate a second fusion feature map 220b by fusing the second feature map 210b and the third feature map 210c. In addition, the feature map fusion unit 120 may generate a third fusion feature map 220c by fusing the third feature map 210c and the fourth feature map 210d, and generate a fourth fusion feature map 220d by fusing the fourth feature map 210d and the fifth feature map 210e. In addition, the feature map fusion unit 120 may generate a fifth fusion feature map 220e by fusing the fifth feature map 210e and the sixth feature map 210f. Finally, since the sixth feature map 210f does not have an adjacent low-resolution feature map, the sixth feature map itself may be generated to a sixth fusion feature map 220f without a fusion process.

As such, the feature map fusion unit 120 may generate a fusion feature map by fusing each feature map with the adjacent low-resolution feature map in order to use context information in the image.

A detailed structure of the feature map fusion unit 120 is as illustrated in FIG. 3.

Referring to FIG. 3, the feature map fusion unit 120 according to the embodiment of the present disclosure is configured to include a first convolutional layer 310, a deconvolutional layer 320, a second convolutional layer 330, and a normalization layer 340, and a fusion layer 350.

The first convolution layer 310 is a means for converting and outputting a high-resolution feature map of two feature maps into an output volume.

As illustrated in FIG. 3, a feature map of 2H×2W×512 may be converted into an output volume. Since an operation method itself of the convolution layer is obvious to those skilled in the art, a separate description thereof will be omitted.

The deconvolution layer 320 is a means for converting a low-resolution feature map of the two feature maps into the same size as the high-resolution feature map.

For example, a feature map of H×W×512 may be converted into the same size as the 2H×2W×512 which is a high-resolution feature map.

That is, the deconvolution layer 320 serves to make the sizes of the low-resolution feature map and the high-resolution feature map the same.

The second convolution layer 330 preserves context information of the size-converted low-resolution feature map and performs a function of converting the size-converted low-resolution feature map into the output volume.

The normalization layer 340 is a means for normalizing a result output by the second convolution layer 330.

The fusion layer 350 is a means for summing and fusing the result of the first convolution layer 310 and features normalized by the normalization layer 340 in units of elements (pixels).

A final output feature (i.e., fusion feature map) fused by the fusion layer 350 may be generated to a feature map having the same size as the high-resolution feature map, but further including detailed context information.

As a result, the feature map fusion unit 120 may reconstruct a feature map pyramid having the context information. As a result, there is an advantage of being more robust to multi-scale object detection.

The object detection unit 130 may detect objects using a multi-scale fusion feature map having the context information generated by the feature map fusion unit 120.

The memory 140 is a means for storing various instructions (program codes) required to perform a multiple object detection method capable of detecting multiple objects based on adjacent feature fusion according to an embodiment of the present disclosure.

The processor 150 is a means for controlling internal components (e.g., the feature map extraction unit 110, the feature map fusion unit 120, the object detection unit 130, the memory 140, etc.) of the multiple object detection apparatus 100 according to an embodiment of the present disclosure.

FIG. 4 is a table comparing results of detecting multiple objects according to an embodiment of the present disclosure and the related art, and FIG. 5 is a diagram illustrating a data set used to derive a result in FIG. 4.

In order to compare multiple object detection results according to an embodiment of the present disclosure and the related art, it was evaluated based on the Pascal Visual Object Class (VOC) challenge 2007 detection benchmark. Data sets (see FIG. 4) for test consist of about 5k images and 20 object categories. If an intersection over union (IOU) between a predicted box and a ground truth is higher than 0.5, it is considered that the object detection is successful. Mean average precision (mAP) was used as an index of evaluation of detection performance.

In an embodiment of the present disclosure, VOC 2007 'trainval' and VOC 2012 'trainval' were learned. In an embodiment of the present disclosure, a single Nvidia 1080 Ti GPU was used, a batch size was set to 32, and an input image was set to 320×320. An initial learning rate was set to 0.001, and the learning rate multiplied by the existing 0.1 at the number of learning times of 80 k, 100 k, and 120 k is reset. In addition, the total iteration was set up to 140 k. In an embodiment of the present disclosure, weight decay was set to 0.0005, and an optimizer may use stochastic gradient descent (SGD) as 0.9 momentum. In addition, VGG16, pre-trained with ImageNet, was used as a backbone.

FIG. 4 is a diagram illustrating experimental results in Pascal VOC 2007 of comparing a multiple object detection result according to an embodiment of the present disclosure with a conventional result. It can be seen that a model of the present disclosure with 320 size as an input achieves 79.1% mAP, which is 1.9% higher than SSD 300.

In addition, it can be seen that the highest detection result was achieved among other models based on an SSD with 300 size as an input. When a higher 512 size is input, the model of the present disclosure shows 1.2% and 0.2% higher results when compared with SSD512 and RSSD 512.

In addition, it can be seen that the multiple object detection processing speed of the present disclosure is 33 frames per second (FPS) based on 1080 Ti, and is superior when considering a tradeoff between the processing speed and the detection performance. Additionally, the multiple object detection result according to an embodiment of the present disclosure achieved higher mAP and FPS than other two-stage methods.

FIG. 6 illustrates several examples of detecting multiple object detection results for Pascal VOC2007 according to a conventional SSD and an embodiment of the present disclosure. In FIG. 6, in the same image pair, the left side illustrates a conventional SSD detection result, and the right side illustrates a multiple object detection result according to an embodiment of the present disclosure. It can be seen that the SSD does not well detect crowded objects such as people and cars, occluded objects, and small objects in the road scene.

However, it can be seen that the multiple object detection result according to an embodiment of the present disclosure shows that in the same case, the present model distinguishes these objects well and shows a high detection result.

As a result, it can be seen that a feature pyramid fused with adjacent features according to an embodiment of the present disclosure is more robust to multi-scale objects than in the related art by preserving and using context information.

Figure 7:
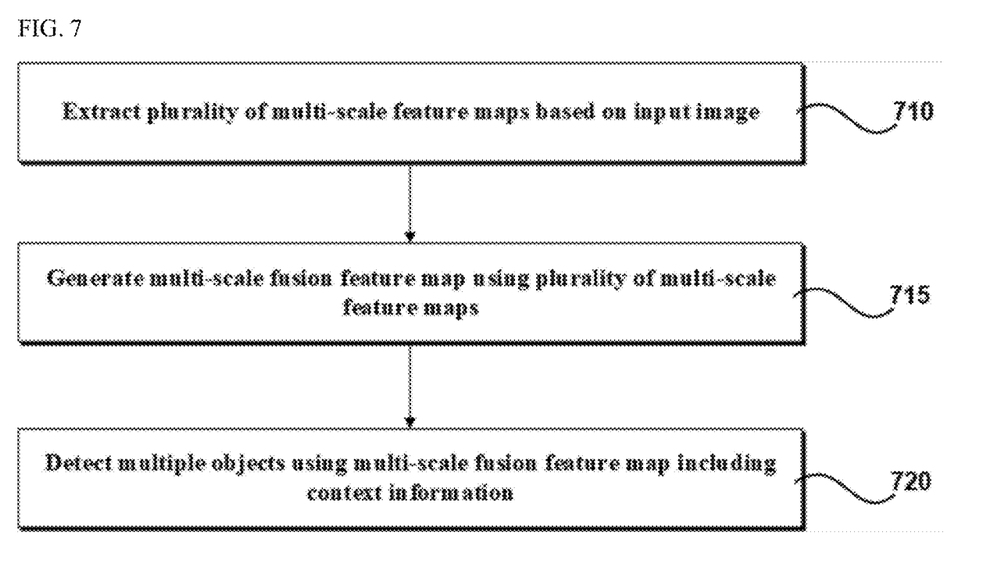
FIG. 7 is a flowchart illustrating a multiple object detection method according to an embodiment of the present disclosure.

FIG. 7 is a flowchart illustrating a configuration of a multiple object detection method according to an embodiment of the present disclosure.

In step 710, the multiple object detection apparatus 100 extracts a plurality of multi-scale feature maps based on an input image.

As described above, the multiple object detection apparatus 100 may use a plurality of multi-scale feature maps extracted from the SSD as a backbone.

In step 715, the multiple object detection apparatus 100 generates a fusion feature map using the plurality of multi-scale feature maps.

That is, the multiple object detection apparatus 100 may generate a fusion feature map including context information by fusing a plurality of adjacent feature maps.

As described above, the multiple object detection apparatus 100 may generate the same number of multi-scale fusion feature maps by fusing each feature map with an adjacent low-resolution feature map.

Since this is the same as described above, the repeated description will be omitted. As such, the generated fusion feature map includes context information.

In step 720, the multiple object detection apparatus 100 detects multiple objects using a multi-scale fusion feature map including context information.

Since the multiple object detection method itself is the same as that of the SSD, a separate description thereof will be omitted.

As in an embodiment of the present disclosure, since the multi-scale fusion feature map generated by fusing the adjacent feature maps uses context information, there is an advantage of being more robust to a multi-scale object.

The device and the method according to the embodiment of the present disclosure may be implemented in a form of program instructions which may be performed through various computer means to be recorded in a computer readable medium. The computer readable medium may include program instructions, data files, data structures, and the like alone or in combination. The program instructions recorded in the computer readable medium may be specially designed and configured for the present disclosure, or may be publicly known to and used by those skilled in a computer software field. Examples of the computer readable medium include magnetic media such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program instructions. Examples of the program instructions include high language codes executable by a computer using an interpreter and the like, as well as machine language codes created by a compiler.

The hardware device described above may be configured to be operated as one or more software modules to perform the operation of the present disclosure and vice versa.

Hereinabove, the present disclosure has been described with reference to the embodiments thereof. It will be understood to those skilled in the art that the present disclosure may be implemented as a modified form without departing from an essential characteristic of the present disclosure. Therefore, the disclosed embodiments should be considered in an illustrative viewpoint rather than a restrictive viewpoint. The scope of the present disclosure is illustrated by the appended claims rather than by the foregoing description, and all differences within the scope of equivalents thereof should be construed as being included in the present disclosure.

What is claimed is:

1. A multiple object detection apparatus, comprising:
   a feature map generation unit for generating a plurality of multi-scale feature maps based on an input image; and
   a feature map fusion unit for generating a multi-scale fusion feature map to construct a multi-scale feature map pyramid including context information by fusing adjacent feature maps among the plurality of multi-scale feature maps generated by the feature map generation unit,
   wherein the multi-scale feature map pyramid is composed of multi-scale fusion feature maps having the same number as the number of the multi-scale feature maps generated by the feature map generation unit,
   wherein the feature map fusion unit generates the multi-scale fusion feature map by fusing each multi-scale feature map and an adjacent low-resolution multi-scale feature map,
   wherein a multi-scale feature map with the smallest scale among the plurality of multi-scale feature maps has no adjacent low-resolution multi-scale feature map to generate the multi-scale fusion feature map without fusion;
   wherein the feature map fusion unit comprising:
   a first convolutional layer for converting a high-resolution multi-scale feature map of two multi-scale feature maps into an output volume;
   a deconvolution layer for converting a low-resolution multi-scale feature map of the two multi-scale feature maps into the same size as the high-resolution multi-scale feature map;
   a second convolutional layer for converting the converted low-resolution multi-scale feature map into the output volume; and
   a fusion layer for generating the multi-scale fusion map including the context information by summing the output volume of the first convolutional layer and the output volume of the second convolutional layer, respectively.

2. The multiple object detection apparatus of claim 1, wherein the feature map generation unit is a single shot multibox detector (SSD).

3. The multiple object detection apparatus of claim 1, further comprising:
   An object detection unit for detecting objects using the multi-scale fusion feature map including the context information generated by the feature map fusion unit.

4. A multiple object detection method comprising the steps of:
   (a) generating a plurality of multi-scale feature maps based on an input image; and
   (b) generating a multi-scale fusion feature map to construct a multi-scale feature map pyramid including context information by fusing adjacent multi-scale feature maps among the plurality of multi-scale feature maps,
   wherein the multi-scale fusion feature map is generated by fusing each multi-scale feature map and an adjacent low-resolution multiscale feature map, wherein a multi-scale feature map with the smallest scale among the plurality of multi-scale feature maps has no adjacent low-resolution multi-scale feature map to generate the multi-scale fusion feature map without fusion,
   wherein the multi-scale feature map pyramid is composed of multi-scale fusion feature maps having the same number as the number of the generated multi-scale feature maps, wherein step (b) comprises the steps of:
converting a high-resolution multi-scale feature map of two multi scale feature maps into an output volume by means of a convolution layer;
converting a low-resolution multi-scale feature map of the two multi-scale feature maps into the same size as the high-resolution multi-scale feature map;
converting the converted low-resolution multi-scale feature map into the output volume by means of the convolution layer; and
generating the multi-scale fusion feature map including the context information by summing the output volume of the high-resolution multi-scale feature map and the output volume of the converted low-resolution multi-scale feature map, respectively.

5. The multiple object detection method of claim 4, wherein in step (b), the multi-scale fusion feature map is generated by fusing each multi-scale feature map and an adjacent low-resolution multi-scale feature map,
wherein a multi-scale feature map with the smallest scale among the plurality of multi-scale feature maps has no adjacent low-resolution multi-scale feature map to generate the multi-scale fusion feature map without fusion.

6. The multiple object detection method of claim 4, further comprising:
after step (b),
detecting objects using the multi-scale fusion feature map including the generated context information.

7. A non-transitory computer readable medium which records program codes for executing the method of claim 4.

\* \* \* \* \*